(12) United States Patent
Drewes et al.

(10) Patent No.: US 12,352,470 B2
(45) Date of Patent: Jul. 8, 2025

(54) HELIOSTAT SUB-ASSEMBLY (71) Applicant: Vast Solar Pty Ltd, Sydney (AU)

(72) Inventors: Kurt Friedrich Drewes, Sydney (AU);
Bruce Alexander Leslie, Sydney (AU)

(73) Assignee: Vast Solar Pty Ltd, Sydney (AU)

( * ) Notice: Subject to any disclaimer, the term of this patent is extended or adjusted under 35 U.S.C. 154(b) by 231 days.

(21) Appl. No.: 17/299,711

(22) PCT Filed: Dec. 4, 2019

(86) PCT No.: PCT/AU2019/051321
§ 371 (c)(1),
(2) Date: Jun. 3, 2021

(87) PCT Pub. No.: WO2020/113266
PCT Pub. Date: Jun. 11, 2020

(65) Prior Publication Data
US 2022/0057112 A1    Feb. 24, 2022

(30) Foreign Application Priority Data
Dec. 4, 2018   (AU) ................................. 2018904610

(51) Int. Cl.
*F24S 23/70*   (2018.01)
*F24S 23/74*   (2018.01)
(Continued)

(52) U.S. Cl.
CPC ............... *F24S 23/82* (2018.05); *F24S 23/70* (2018.05); *F24S 23/74* (2018.05); *G02B 5/10* (2013.01);
(Continued)

(58) Field of Classification Search
CPC .. F24S 23/70; F24S 23/71; F24S 24/74; F24S 23/82; F24S 25/63; F24S 2025/014;
(Continued)

(56) References Cited

U.S. PATENT DOCUMENTS 2,707,903 A * 5/1955 Trombe .................. G02B 5/10
126/696
3,514,776 A * 5/1970 Mulready ............... G01S 17/87
219/121.81
(Continued)

FOREIGN PATENT DOCUMENTS

CL    2015001872    9/2015
CN   101051869 A   10/2007
(Continued)

OTHER PUBLICATIONS

Vast Solar Pty Ltd, Examination Report, CL202101462, Sep. 5, 2022, 15 pgs.
(Continued)

*Primary Examiner* — Ricky D Shafer
(74) *Attorney, Agent, or Firm* — Morgan, Lewis & Bockius LLP (57) ABSTRACT

The invention relates to a heliostat sub-assembly and to a method of forming such a sub-assembly. The method of mounting a concave mirror to a supporting structure of a heliostat includes the steps of bonding a plurality of risers at predetermined spaced intervals to a rear face of the mirror, each riser having a bonding pad and a stem extending from the bonding pad, and applying a predetermined concave curvature to the mirror by conforming the front face of the mirror with a convex forming jig or die. The supporting structure and curved mirror are then aligned, and the supporting structure is clinched to the stems of the risers when the curved mirror is conformed with the forming die. The riser stems may be coupled to the bonding pads via multi-axial joint assemblies to enable limited multi-pivotal movement of the stems relative to the bonding pads to facilitate alignment of faces of the stems with the faces of the ribs defined by webs, and relative expansion and contraction of the mirror and supporting structure, the overlap between the (Continued)

riser stems and the webs being sufficient to accommodate clinching with variations in curvature of the glass sheet.

20 Claims, 13 Drawing Sheets

(51) Int. Cl.
| | |
|---|---|
| *G02B 5/10* | (2006.01) |
| *G02B 7/182* | (2021.01) |
| *G02B 7/183* | (2021.01) |
| *G02B 7/198* | (2021.01) |
| *F24S 25/00* | (2018.01) |
| *F24S 25/60* | (2018.01) |

(52) U.S. Cl.
CPC ............ *G02B 7/1821* (2013.01); *G02B 7/183* (2013.01); *G02B 7/198* (2013.01); *F24S 2025/014* (2018.05); *F24S 2025/6009* (2018.05); *F24S 2025/601* (2018.05); *F24S 2025/6013* (2018.05); *F24S 2025/806* (2018.05)

(58) Field of Classification Search
CPC ......... F24S 2025/6009; F24S 2025/601; F24S 2025/6013; F24S 2025/806; F24S 23/74; G02B 5/10; G02B 7/1721; G02B 7/183; G02B 7/198
USPC ........ 359/846, 849, 853, 871; 126/684, 685, 126/694, 696; 353/3
See application file for complete search history.

(56) References Cited

U.S. PATENT DOCUMENTS

| | | | | |
|---|---|---|---|---|
| 4,239,034 | A * | 12/1980 | Niedermeyer | F24S 25/00 126/685 |
| 4,245,895 | A * | 1/1981 | Wildenrotter | H02S 20/10 136/246 |
| 4,435,043 | A | 3/1984 | Mertens et al. | |
| 4,502,200 | A * | 3/1985 | Anderson | F24S 23/82 29/897 |
| 6,217,178 | B1 * | 4/2001 | Drumheller | F24S 25/60 359/849 |
| 7,136,156 | B1 | 11/2006 | Quint | |
| 10,247,907 | B2 * | 4/2019 | Zamel | G02B 7/181 |
| 2005/0217665 | A1 * | 10/2005 | Luconi | F24S 25/65 126/696 |
| 2010/0158431 | A1 | 6/2010 | Huffman et al. | |
| 2011/0069302 | A1 | 3/2011 | Hill et al. | |
| 2012/0226452 | A1 | 9/2012 | Hill et al. | |
| 2012/0230629 | A1 | 9/2012 | Hill et al. | |
| 2013/0279034 | A1 * | 10/2013 | Bender | G02B 26/0816 359/849 |
| 2014/0043705 | A1 * | 2/2014 | Lehmann | G02B 26/0816 359/849 |
| 2014/0150774 | A1 * | 6/2014 | Chang | F24S 25/10 126/600 |
| 2015/0007871 | A1 | 1/2015 | Durney et al. | |
| 2016/0252414 | A1 | 9/2016 | Preston et al. | |
| 2017/0115034 | A1 | 4/2017 | Fortin et al. | |

FOREIGN PATENT DOCUMENTS

| | | |
|---|---|---|
| CN | 102243795 A | 11/2011 |
| CN | 204479830 U | 7/2015 |
| CN | 204479831 U | 7/2015 |
| CN | 106443958 | 12/2017 |
| DE | 3131263 C1 | 2/1983 |
| WO | WO2012159204 A1 | 11/2012 |
| WO | WO2014/102415 A1 | 7/2014 |
| WO | WO2015/158926 A1 | 10/2015 |
| WO | WO2016/176439 A1 | 11/2016 |
| WO | WO2018/048890 A1 | 3/2018 |
| WO | WO2018151655 A1 | 8/2018 |

OTHER PUBLICATIONS

Vast Solar Pty Ltd, International Search Report and Written Opinion, PCT/AU2019/051321, Dec. 13, 2019, 8 pgs.
Vast Solar Pty Ltd, International Preliminary Report on Patentability, PCT/AU2019/051321, Jun. 8, 2021, 5 pgs.
Fiber Sense Limited, Communication Pursuant to Article 94(3), EP17869895.7, Apr. 12, 2023, 47 pgs.
Machine English Translation of CN204479830U, Year: 2015.
Vast Solar Pty Ltd, Extended European Search Report, EP19891964.9, Jul. 25, 2022, 10 pgs.
Vast Solar Pty Ltd, Communication Pursuant to Article 4(3), EP19891964.9, Feb. 16, 2024, 5 pgs.
Vast Solar Pty Ltd, Non-Final Office Rejection, P6000923/2021, Aug. 6, 2024, 7 pgs.
Vast Solar Pty Ltd, Examination Report, MX/a/2021/006624, Aug. 26, 2024, 10 pgs.
Vast Solar Pty Ltd, Examination Report, AP/P/2021/013247, Sep. 24, 2024, 4 pgs.

* cited by examiner

HELIOSTAT SUB-ASSEMBLY

CROSS REFERENCE TO RELATED APPLICATIONS

This Application is a United States National Stage Application filed under 35 U.S.C. § 371 of PCT Patent Application Serial No. PCT/AU2019/051321, filed on Dec. 4, 2019, which claims the benefit of and priority to Australian Patent Application No. 2018904610, filed on Dec. 4, 2018, which is hereby incorporated by reference in its entirety.

FIELD OF THE INVENTION

This invention relates to a heliostat sub-assembly and to a method of forming such a sub-assembly.

BACKGROUND OF THE INVENTION

Heliostats are typically used in the area of concentrating solar power (CSP) to redirect sunlight onto a focal point provided by a receiver on a central tower. The heliostats are typically arranged in a series of arcs around the tower at distances typically varying from 30 m to 250 m or more. Each heliostat generally includes a concave mirror with focal length corresponding to the distance between the mirror and the receiver and a support structure to hold the mirror.

The support structure may include a support frame to which the mirror is mounted and a ground-engaging stand or post arrangement which is mounted to the frame in a manner which allows the mirror to be articulated with two degrees of rotational freedom so that the sun can be tracked to maintain the focal point of the mirror on the receiver. Larger heliostats may include an array of planar mirror panels on sub-frames which are configured in on a main support structure to focus the mirror panels on a target, with the support structure mounted on the post as described above.

The mirror(s) may rotate about an azimuth axis perpendicular to the earth's surface, as well as about an elevation axis which is parallel to the earth's surface. Alternatively tip and tilt axes may be employed. A computer-controlled actuator is used to sequentially move the mirror about the two axes.

In the case of a single mirror heliostat which is located relatively far from the receiver, at a distance of say 250 m, the mirror is only very slightly concave, with the centre of the mirror being only about 3 mm offset from the x-y plane in the z-direction in comparison with the corners, in the case of a rectangular mirror of approximately 3 m×2 m. Accordingly, the curvature of the mirror needs to be highly precise in the direction normal to the plane of the mirror, with accuracy required in the fractions of a millimetre. To manufacture a lightweight steel frame of these dimensions which is capable of holding a mirror within a few millimetres of flatness is a difficult process, in particular where post-manufacturing processes of hot dipped galvanising are included.

An alternative approach involves forming a backing from a lightweight expanded plastics material into the required paraboloid shape and gluing a sheet of glass directly to the frame. This is also problematic in that the glue takes some time to cure fully, and that the jig has to hold the glass in a deformed state until the glue has fully cured. This usually involves a compromise in which the jig only holds a glass until the glue is partially cured and is then released.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

According to a first aspect there is provided a method of mounting a concave mirror to a supporting structure of a heliostat comprising: bonding a plurality of risers at predetermined spaced intervals to a rear face of the mirror, each riser having a bonding pad and a stem extending from the bonding pad; applying a predetermined concave curvature to the mirror by conforming the front face of the mirror with a convex forming jig or die, aligning the supporting structure and the curved mirror, and clinching the supporting structure to the stems of the risers when the curved mirror is conformed with the forming die.

The supporting structure may comprise a plurality of spaced apart ribs interconnected by at least one transverse beam, the spacing between the ribs corresponding to the spacing between the risers, and locating the ribs against the riser stems prior to clinching.

The risers may be arranged in rows and/or columns which are alignable with the corresponding ribs.

The riser stems may be aligned with faces of the ribs defined by webs, the overlap between the riser stems and the webs being sufficient to accommodate clinching with variations in curvature of the glass sheet.

The support structure may include a sub-frame of at least a pair of transverse beams joined by at least one cross member and pre-galvanised or treated with an anti-corrosion layer. Alternatively the sub-frame may be roll-formed after being provided with a colourbond-style finish.

The ribs may be formed by being drawn from sheet metal into a desired shape with a web and a surrounding flange, with at least one or more central apertures being punched into the webs for accommodating the one or more transverse beams. The ribs may also be extruded from aluminium or a suitable alloy.

According to another aspect there is provided a heliostat sub-assembly comprising: a curved mirror; a plurality of risers bonded at predetermined spaced intervals to a rear face of the mirror, each riser having a bonding pad and a stem extending from the bonding pad; a supporting structure for supporting the mirror, the supporting structure comprising a plurality of spaced ribs interconnected by at least one transverse beam, the spacing between the ribs corresponding to the spacing between the risers, and the ribs being clinched to the riser stems to hold the mirror in position.

The riser stems may be coupled to the bonding pads via multi-axial joint assemblies to enable limited multi-pivotal movement of the stems relative to the bonding pads to facilitate alignment of faces of the stems with the faces of the ribs defined by webs, and relative expansion and contraction of the mirror and supporting structure, the overlap between the riser stems and the webs being sufficient to accommodate clinching with variations in curvature of the glass sheet.

Each of the riser stems may include a foot portion which is slidably connected to the corresponding multi-axial joint assembly to enable limited transverse movement of the riser stems relative to the bonding pads to facilitate alignment of faces of the stems with the faces of the ribs defined by webs for subsequent clinching, as well as relative expansion and contraction of the mirror and supporting structure once clinched.

Each of the multi-axial joint assemblies may include a pin extending through and held loosely captive within a central aperture passing through the bonding pad, the pin including an upper portion carrying a bearing component which includes a bearing socket portion which bears slidably against an upper convex portion of the bonding pad.

The bearing component may be a lower washer, the multi-axial joint assembly may further include an upper washer carried on the upper portion of the pin, the upper and lower washers sandwiching a foot portion of the stem therebetween, and being held captive by a retaining formation on the pin.

The bonding pad may include a circular or oval base portion, a central turret portion and a plurality of radially extending buttressing flanges extending between the base portion and the central turret portion.

The pin may have an expanded base portion which defines an upper part-spherical or convex surface which bears slidably against a socket portion defined by a central recess within the bonding pad.

The supporting structure may include a sub-frame of at least a pair of transverse beams joined by at least one cross member and pre-galvanised or treated with an anti-corrosion layer.

According to a further aspect there is provided a heliostat riser sub-assembly configured to join a curved heliostat mirror to a support frame, the riser sub-assembly including a riser pad having a lower bonding face for enabling the pad to be bonded to the rear face of the mirror, a riser stem having a tab portion configured to form a connection with the support frame, and a multi-axial joint assembly interconnecting the riser pad and the support frame, the multi-axial joint assembly enabling limited movement of the stem relative to the bonding pad to facilitate alignment of the tab portion with a corresponding face of the support frame.

The riser stem may include a foot portion which is slidably connected to the corresponding multi-axial joint assembly to enable limited transverse movement of the riser stem.

The multi-axial joint assembly may include a pin extending through and held loosely captive within a central aperture passing through the bonding pad, the pin including an upper portion carrying a bearing component which includes a bearing socket portion which bears slidably against an upper convex portion of the bonding pad.

The bearing component may include a lower washer, the multi-axial joint assembly further including an upper washer carried on the upper portion of the pin, the upper and lower washers sandwiching a foot portion of the stem therebetween, and being held captive by a retaining formation on the pin.

The multi-axial joint assembly may include play limiting means for limiting multi-axial movement of the riser stems.

The play limiting means includes the central aperture being frusto-conical or outwardly tapered relative to the pin extending through the aperture, and may limit the movement of the riser stem to 4 degrees or less off the central axis of the central aperture.

The supporting structure may include radially extending ribs or ribs which are interconnected in a triangular, pentagonal, hexagonal or other non-rectangular configuration.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
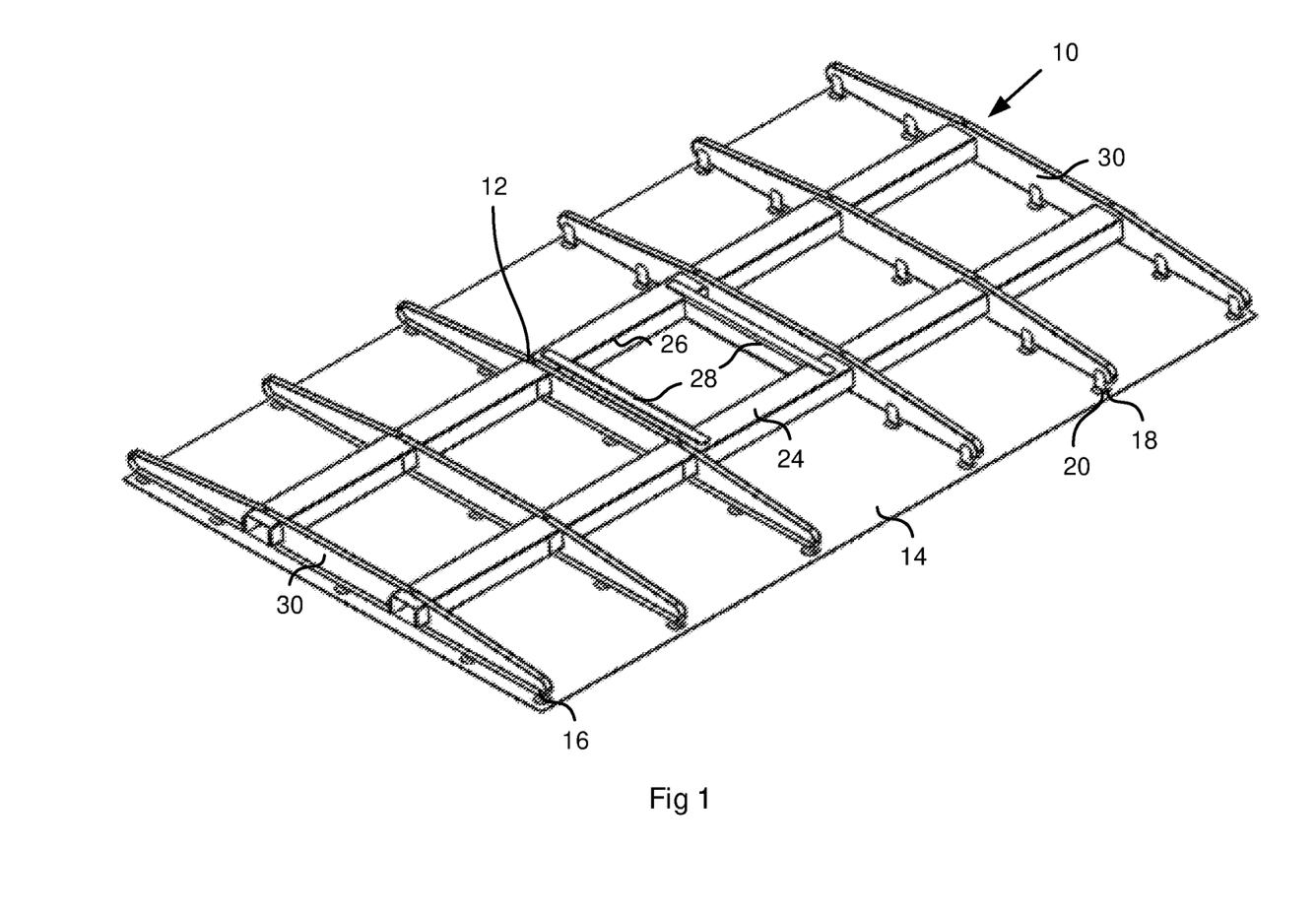
FIG. 1 shows a perspective view of first embodiment of a heliostat sub-assembly.
Figure 2:
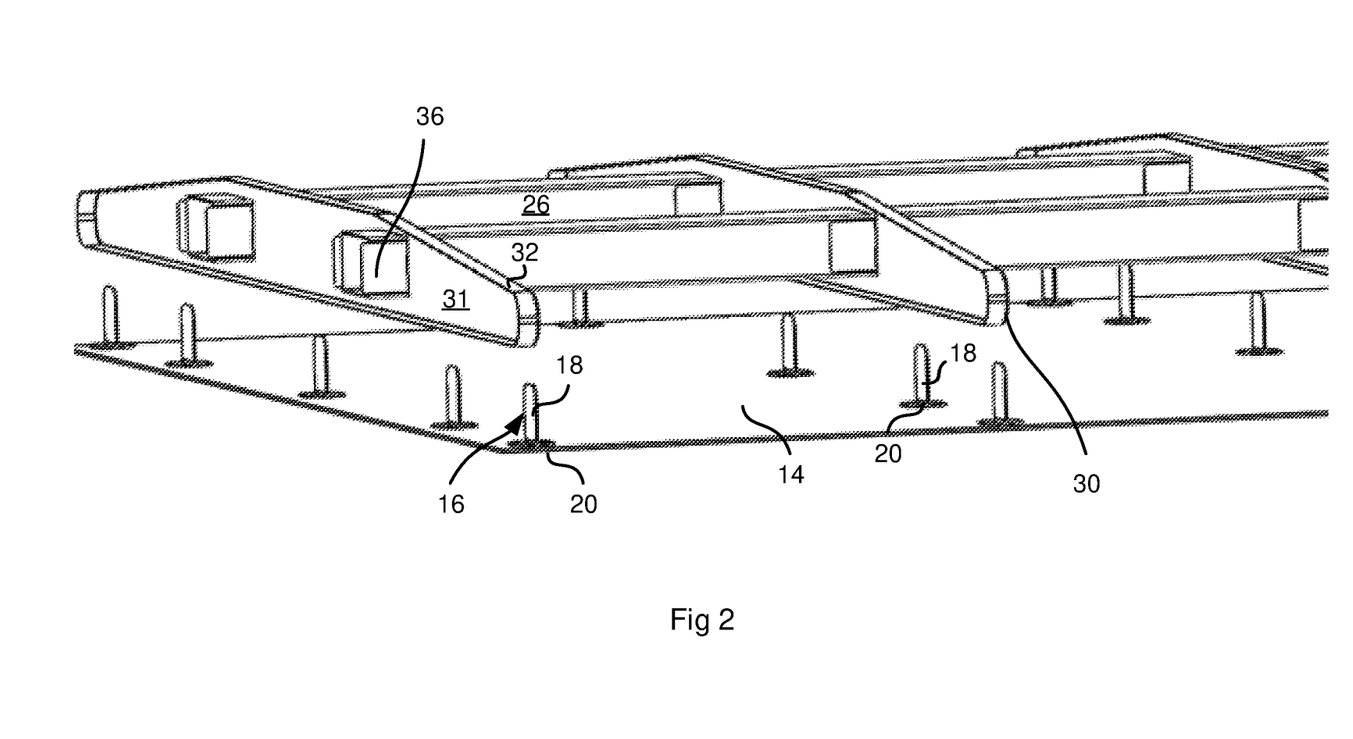
FIG. 2 shows a perspective exploded view of the heliostat sub-assembly of FIG. 1.

Referring first to FIG. 1, a heliostat sub-assembly 10 is shown formed from a lightweight steel frame with corrosion protection 12 which is mounted to the rear surface of a reflective glass sheet 14 via T-shaped risers 16 formed from a suitable material for clinching, typically a metal such as steel or aluminium. As can more clearly be seen in FIG. 2, each of the risers 16 comprises a stem 18 extending from a pad 20 which may have rounded corners or be circular or oval. It will be appreciated that the risers may also be L-shaped. The pads 20 are positioned and bonded to the rear face of the glass 14 in a matrix of predetermined locations, which in the present embodiment include six equ-spaced columns in a 6×5 array. It will be appreciated that the risers could be arranged in any suitable pattern conforming with the direction and pattern of the ribs, as well as the mirrors if not rectangular, including rows, diagonals, triangles, pentagonal, hexagonal or star patterns for example, and that the number and spacing of the risers is variable.

Suitable bonding agents may include epoxy- or silicon-based adhesives with a typical curing time of 1-60 minutes and a long lifespan suited to extreme weather conditions. The bonding operation occurs when the glass sheet is laid out flat on a uniplanar surface defined by a slipway or the like. The riser stems are typically relatively long and thin, in one example being in the region of 75 mm high, 50 mm wide and 2 mm thick. This provides flexibility to overcome manufacturing misalignments normal to the face of each of the riser stems. It can be appreciated that the particular dimensions are widely variable depending on the size of the heliostat, as well as the type of frame employed.

Figure 3:
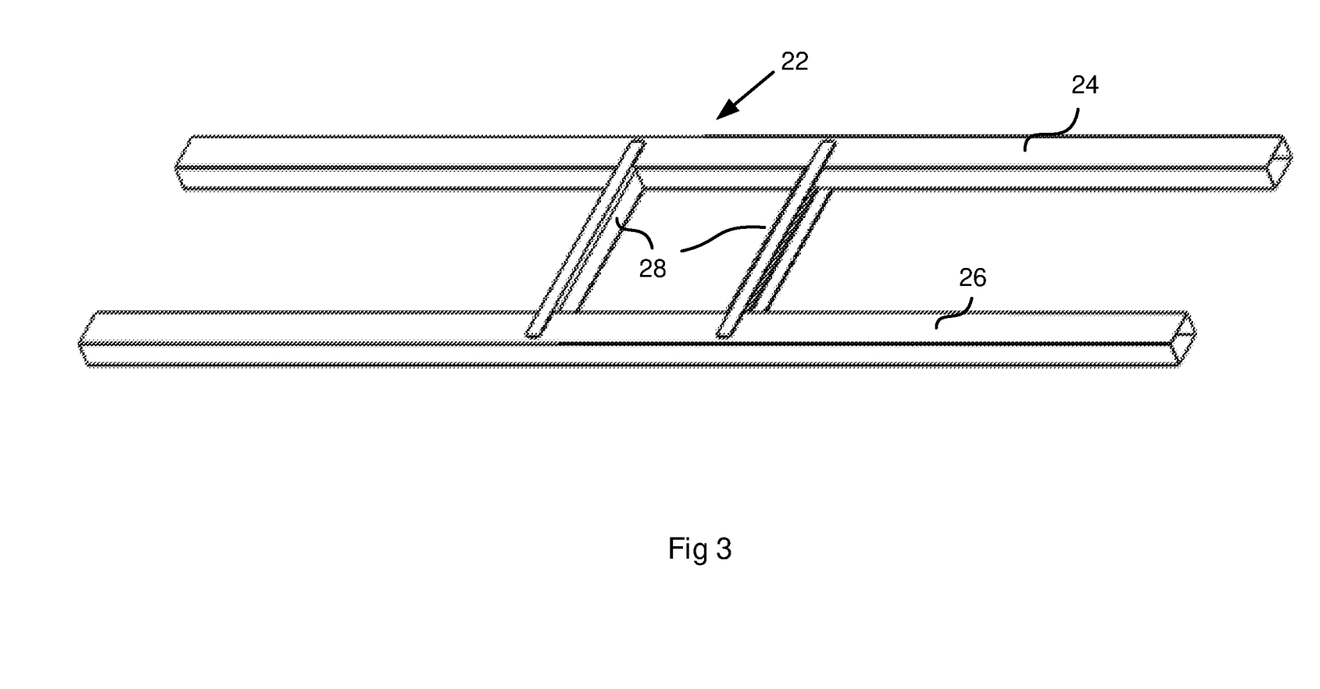
FIG. 3 shows a perspective view of a sub-frame of the sub-assembly.
Figure 4:
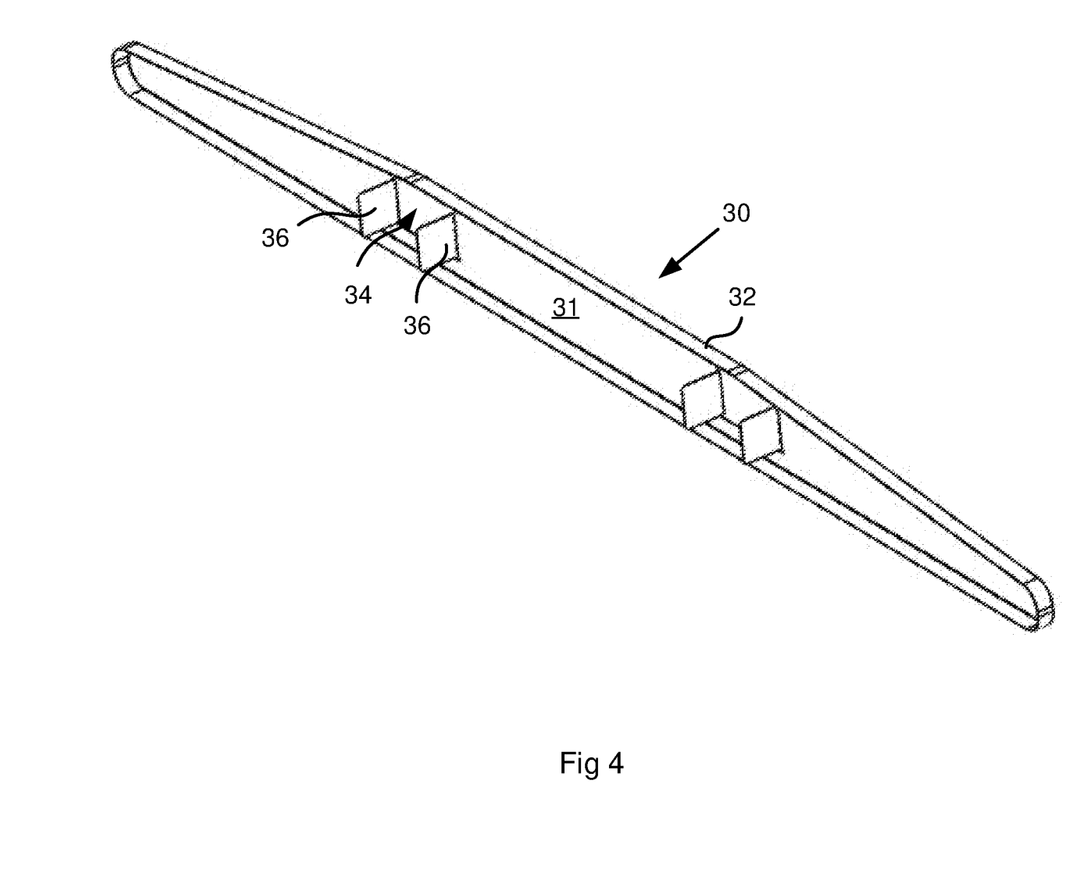
FIG. 4 shows a perspective view of a rib of the sub-assembly.

As is clear from FIGS. 3 and 4, the frame or support structure 12 is formed from a sub-frame 22 including a pair of RHS beams 24 and 26 connected by cross members 28 in an H-configuration. The ends of the cross members 28 are welded to the RHS beams, and the sub-frame is then galvanised. Ribs 30 are then formed by punching and drawing or cutting, bending and welding thin mild steel plate (typically 0.5-3 mm) into the desired double-tapered shape with a web 31 having surrounding flanges 32. Central rectangular apertures 34 are created by punching through the web 31 with the resultant tabs 36 being used for attachment to the RHS beams 24. As is clear from FIGS. 1 and 2, six ribs 30 are slid into position via the complemental apertures 34 onto opposite ends of the RHS beams 24. The ribs are precisely positioned along the RHS beams so that the outer faces of their webs are spaced apart by exactly the same amount as the riser stems 18 with which they are lined up. The flanges or tabs 36 are attached to the RHS beams by clinching or press-forming, riveting or welding, including spot welding. The RHS beams may have other profiles such as an H-section or an I-beam, and may also take the form of one or more torsion bars. It will be appreciated that the sub-frame could be in the form of a clinched and roll-formed sub-frame which has been corrosion proofed using a colour-bond-style finish. Other suitable corrosion resistant finishes may be employed, the frame components may be formed from a corrosion resistant material, or the frame may be formed and then have corrosion protection applied to the assembled frame such as by hot dip galvanising.

Once the riser sub-assemblies have cured and are firmly bonded to the inner face of the mirror, the outer face of the mirror is bent to the desired paraboloid shape over a forming jig or die with an adjustable paraboloid curve in the z-plane about both the x- and y-axes. It should be noted that while the desired shape of the final mirror and frame after the jig is removed is paraboloid (or spherical or spheroid, which for the limited arc referred to is effectively the same or similar) the jig may need to move the mirror into a slightly different shape so that it relaxes into the desired final shape after the jig is removed and the load is taken up by the glue and the frame.

Figure 5:
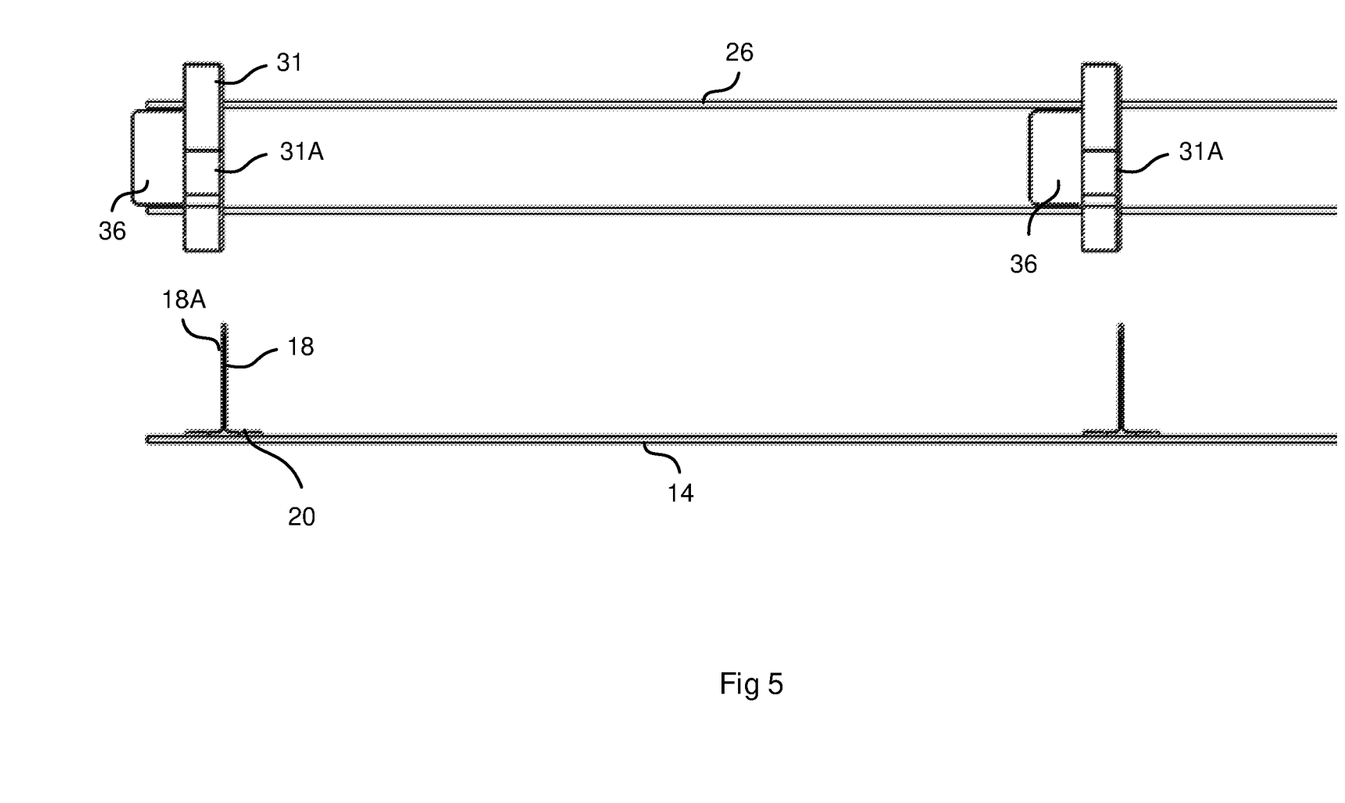
FIG. 5 shows a side view of a frame or support structure positioned above a mirror onto which risers are bonded.

Once the sub-assembly is bent into the desired position, the frame 12 is than aligned in the manner illustrated in FIG. 5, with the planar faces of 31a of the webs 31 vertically aligned with the side faces 18a of the riser stems 18. Once lowered into the desired position illustrated in FIG. 6, the riser stems 18 are clinched or press-formed to the webs 31 of the ribs 30 as can be seen in detail in FIG. 6A using a clinching tool with a suitable clinching die set. There is a small amount of play in both the ends of the ribs 30 and the riser stems 18 which allows adjacent faces to be brought into alignment for the purposes of clinching. The length of the riser stems and the height of the web 31 of each rib 30 is such that there is sufficient clearance for insertion of the clinching die, as well as sufficient overlap between the contiguous faces of the web and the stem, in particular in cases where the curvature of the mirror is greater. This will be necessary for the mirrors of those heliostats which are closer to the receiver.

Figures 6, 6A:
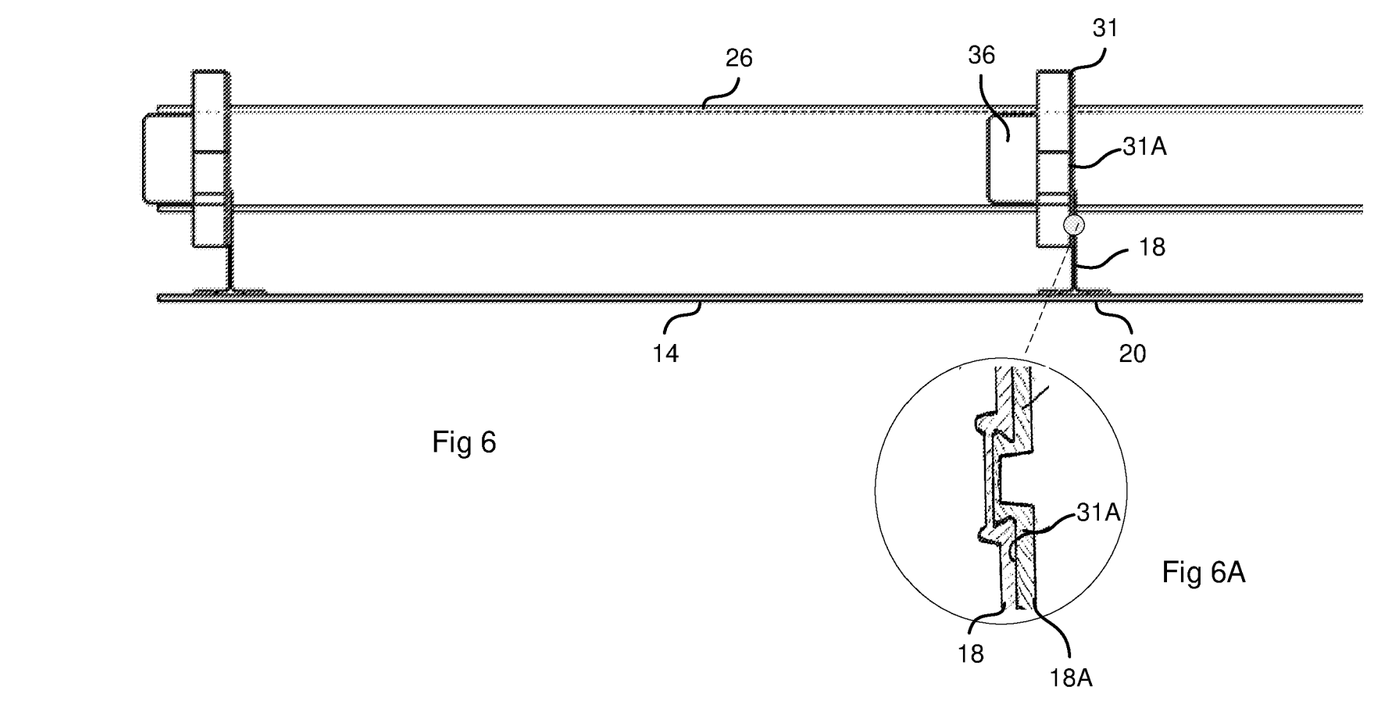
FIG. 6 shows a side view of the frame or support structure mounted to the mirror by the risers.
FIG. 6A shows a detail of the mounting arrangement in which the ribs are clinched to the risers.

By way of example, a mirror which is 40 m away from the receiver will have a curvature about 6 times greater than a mirror which is 240 m away, resulting in an offset of about 20 mm in the z-axis. In this case the outer riser stems will be slightly misaligned The adjacent faces 31A and 18A of the webs and the riser stems allow for sufficient freedom of movement along both the y- and z-axes. This means that the frame does not need to be precision manufactured, and may have dimensional errors. It is also unstressed both during and after being attached to the pre-curved mirror. In addition, provided the inter-rib spacing matches the inter-stem spacing to an acceptable degree the play in the riser stems and the free ends of the ribs allows for greater tolerances in the matching of the spacing in the x-axis.

In one embodiment the ribs may be clinched to the riser stems before they are finally fixed to the RHS beams. This allows for even greater freedom of movement in the x-axis, and generally for freedom of movement in all three axes.

The tabs 36 of the ribs may be clinched to the RHS beams 24 and 26, in which case a clinching jig may be fed through the RHS cavities to the appropriate position.

Figure 7:
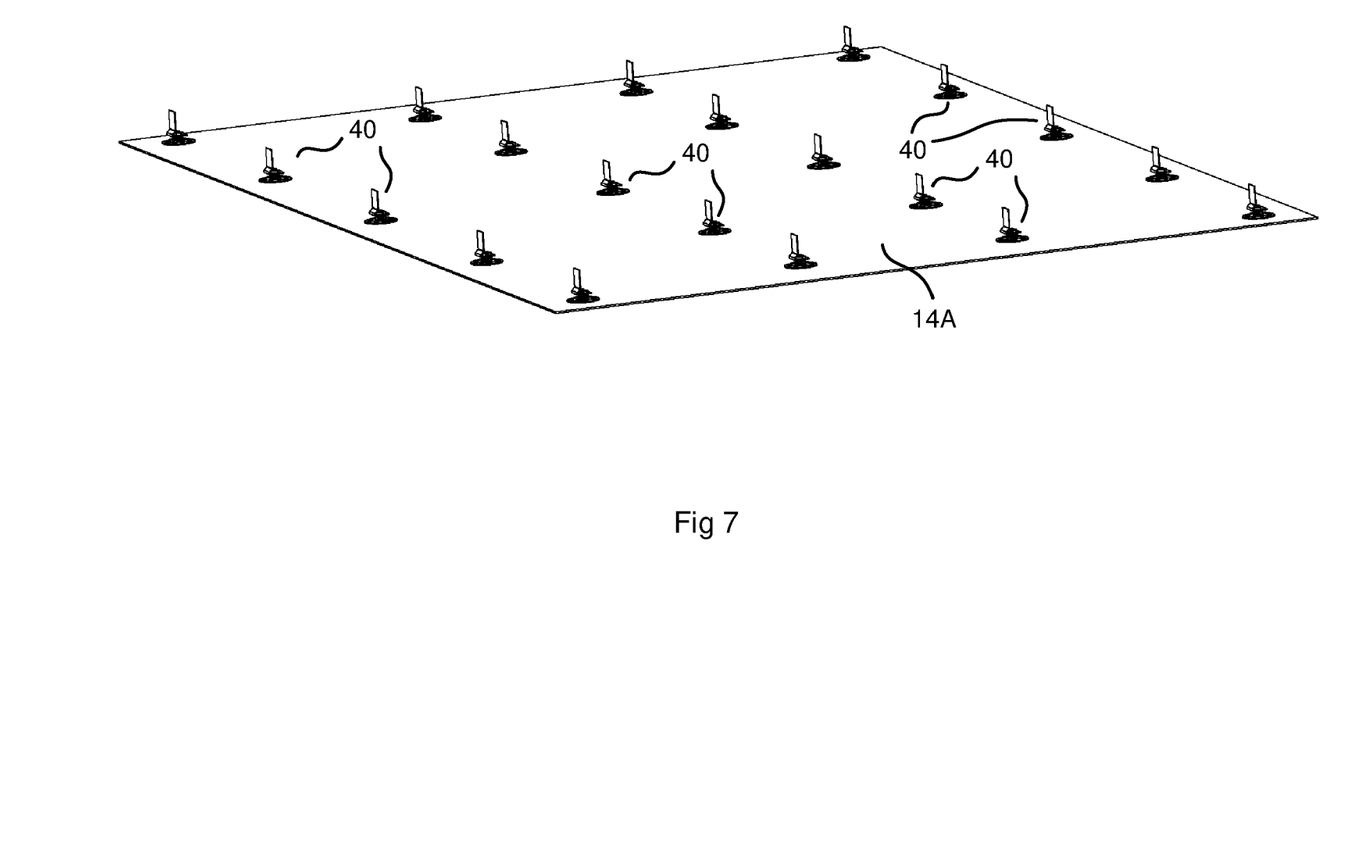
FIG. 7 shows a perspective view of a mirror fitted with an array of risers of a second embodiment.

Referring now to FIG. 7, in a further embodiment a matrix of riser sub-assemblies 40 is bonded to the rear face of a heliostat mirror in predetermined positions in a 4×5 array of equi-spaced rows and columns. The bonding process is similar to that described with reference to the first embodiment. Again the size and configuration of the array is variable as described with reference to the first embodiment. With a radial array being provided for example where there are radial arms extending from a central hub.

Figure 8:
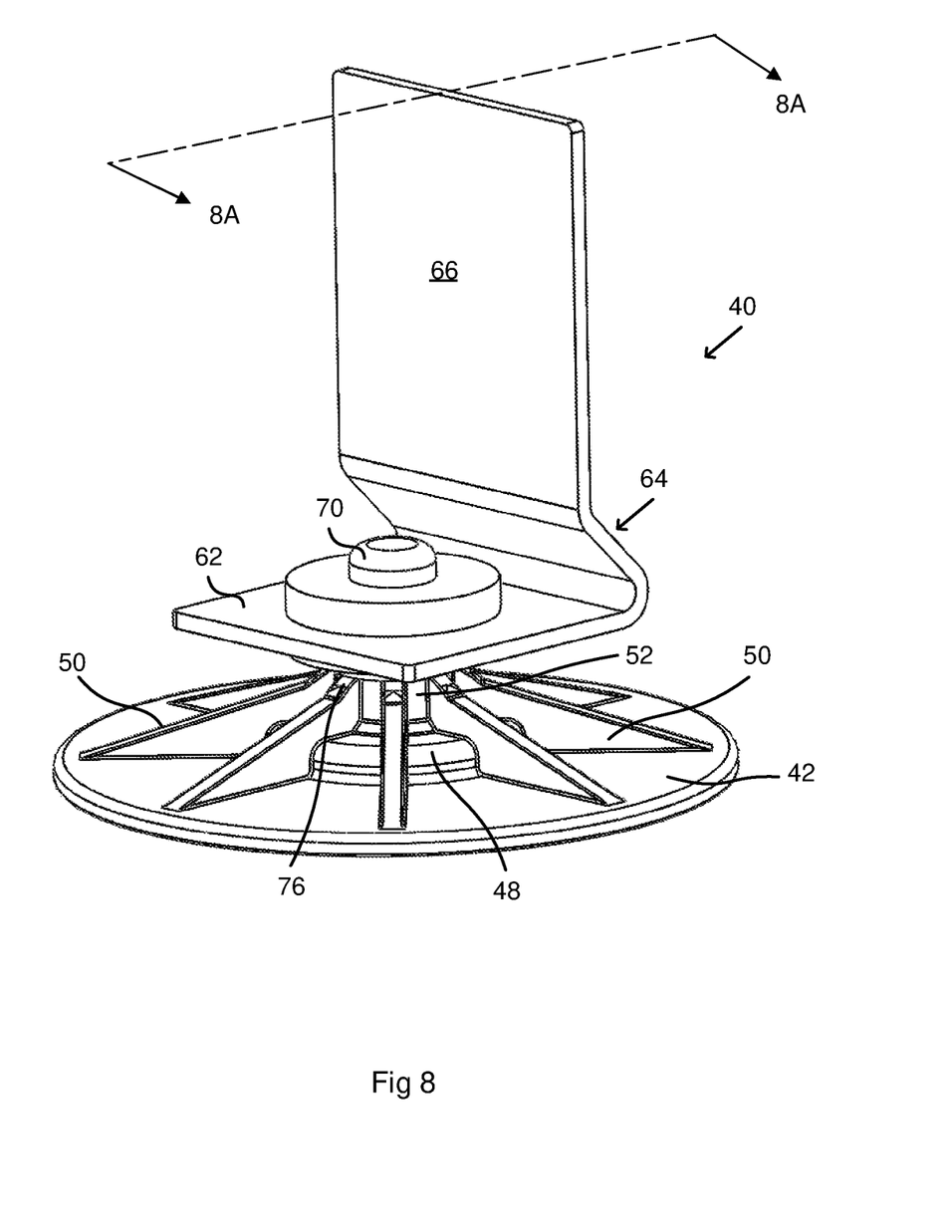
FIG. 8 shows a detailed perspective view of a riser of FIG. 7.
Figure 8A:
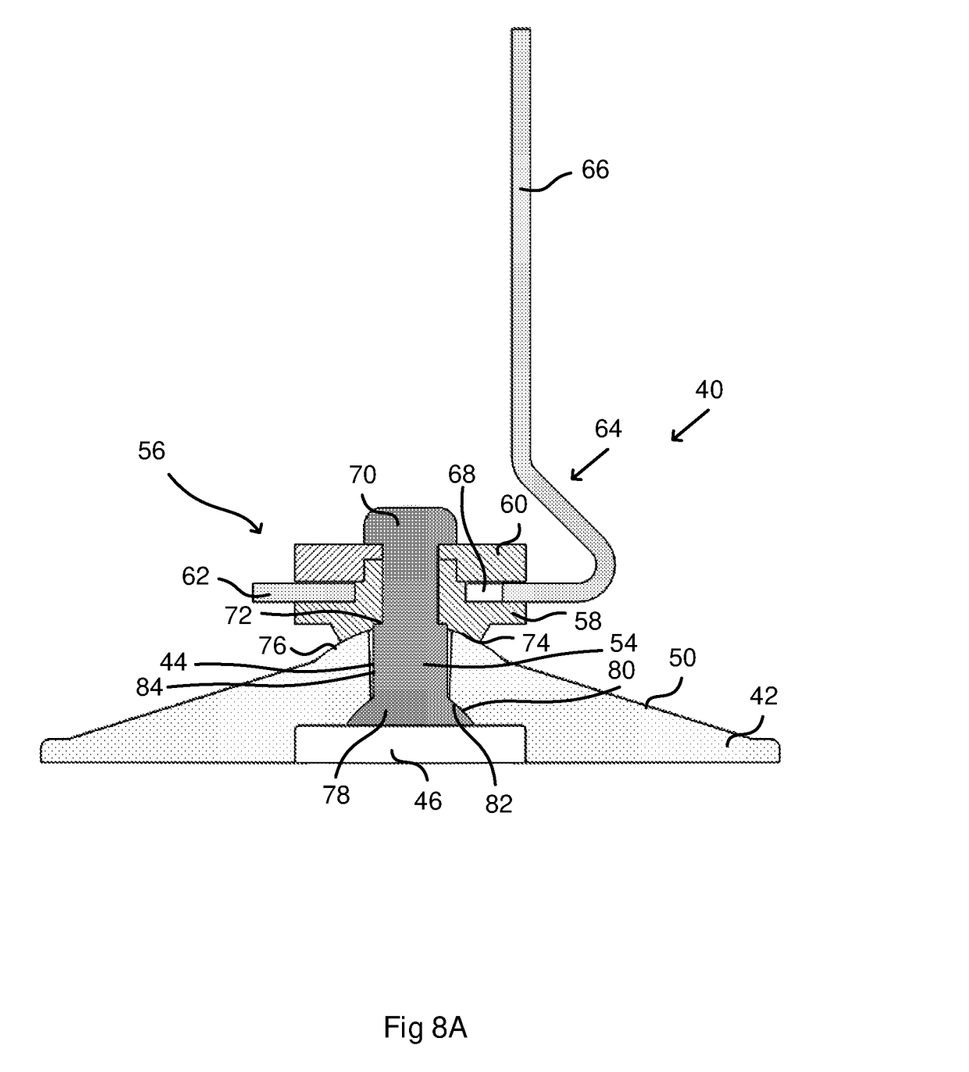
FIG. 8A shows a cross section on the line 8A-8A of FIG. 8.

As is shown in FIGS. 8 and 8A, each of the riser sub-assemblies 40 includes a pad or foot 42 formed with a central aperture 44 which has a lower opening 46 of increased diameter defined by a corresponding raised central hub 48. Eight equi-spaced radial buttressing flanges 50 extend over the hub 48 to a central tubular turret 52 defining the aperture 44 through which a connecting pin 54 passes. The pin 54 forms part of a multi-axial joint assembly 56 which includes a lower cup washer 58 and an upper washer 60.

Sandwiched between the upper and lower washes 60 and 58 is a transverse foot portion 62 of an L-shaped riser stem 64 which includes a vertical tab portion 66. The foot portion 62 is formed with a slotted aperture 68 which allows limited transverse movement of the riser stem 64. The pin 54 terminates in an upper expanded rivet head 70, with the upper and lower washers 60 and 58 being held captive between the rivet head 70 and an intermediate shoulder 72 of the pin. In an alternative embodiment the rivet head 70 may be replaced with one or more fastening nuts carried on a corresponding threaded portion of the pin.

The cup washer 58 includes a lower bearing socket face 74 having a part spherical or concave profile. The bearing socket face 74 bears slidingly against upper portions of the buttressing flanges 50 which have a corresponding arcuate profile 76, in combination providing a convex profile. The pin 54 has a lower foot 78 with an upper part-spherical surface 80 which bears against a corresponding part-spherical socket 82 defined in the lower opening 46 of the pad 42. It will be noted that the central aperture 44 is frusto-conical which results in gap 84 allowing limited freedom of movement of the multi-axial joint assembly about a 360° conical locus. This is facilitated by the aforementioned part-spherical bearing faces of the pin, pad, cup washer and buttressing flanges. This in turn provides the riser stem 64 with corresponding freedom of movement about the conical locus.

In one example, the maximum curvature of most curved mirrors at the ends of the mirrors is ~2.5° at the ends of the sides and ~1.5° at the top and bottom ends. This would result in a required freedom of movement of ~2° from the normal axis of the pin. It will be appreciated that for larger mirrors at a focal length of, say, 50 m angles of ~3-4° or more may be required, with freedom of movement achieved by the corresponding frusto-conical taper angle of the central aperture.

It will be appreciated that various other multi-axial joint-type assemblies and configurations may be used to achieve the freedom of movement of the riser stem of the type described above, including both limited transverse sliding movement as well as 360 degree movement about a conical or conical-type locus. For example, a simpler but less versatile configuration could include a pivoting connection for enabling limited pivoting movement about an axis parallel to the transverse sliding locus, or a combination of a rotary and pivoting connection.

Once the riser sub-assemblies 40 have cured and are firmly bonded to the inner face of the mirror 14A, the outer face of the mirror is bent to the desired parabolic shape over a forming jig or die with an adjustable parabolic curve in the z-plane about both the x- and y-axes in the manner previously described with reference to the first embodiment. It should be noted that while the desired shape of the final mirror and frame after the jig is removed is paraboloid or spherical/spheroid the jig may need to move the mirror into a slightly different shape so that it relaxes into the desired final shape after the jig is removed and the load is taken up by the glue and the frame.

Figure 9:
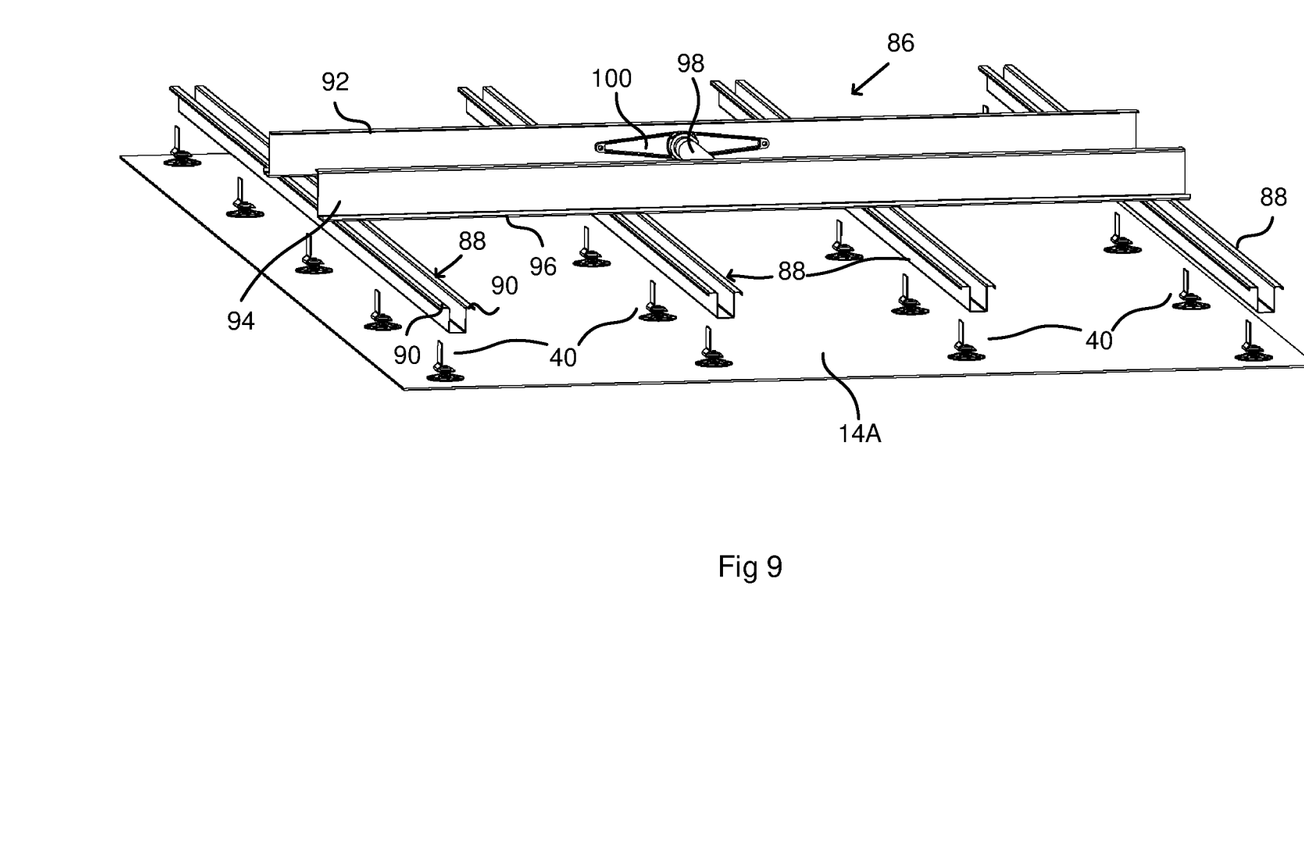
FIG. 9 shows a perspective view of a frame or support structure being lowered over the mirror and risers of FIG. 7.
Figure 9A:
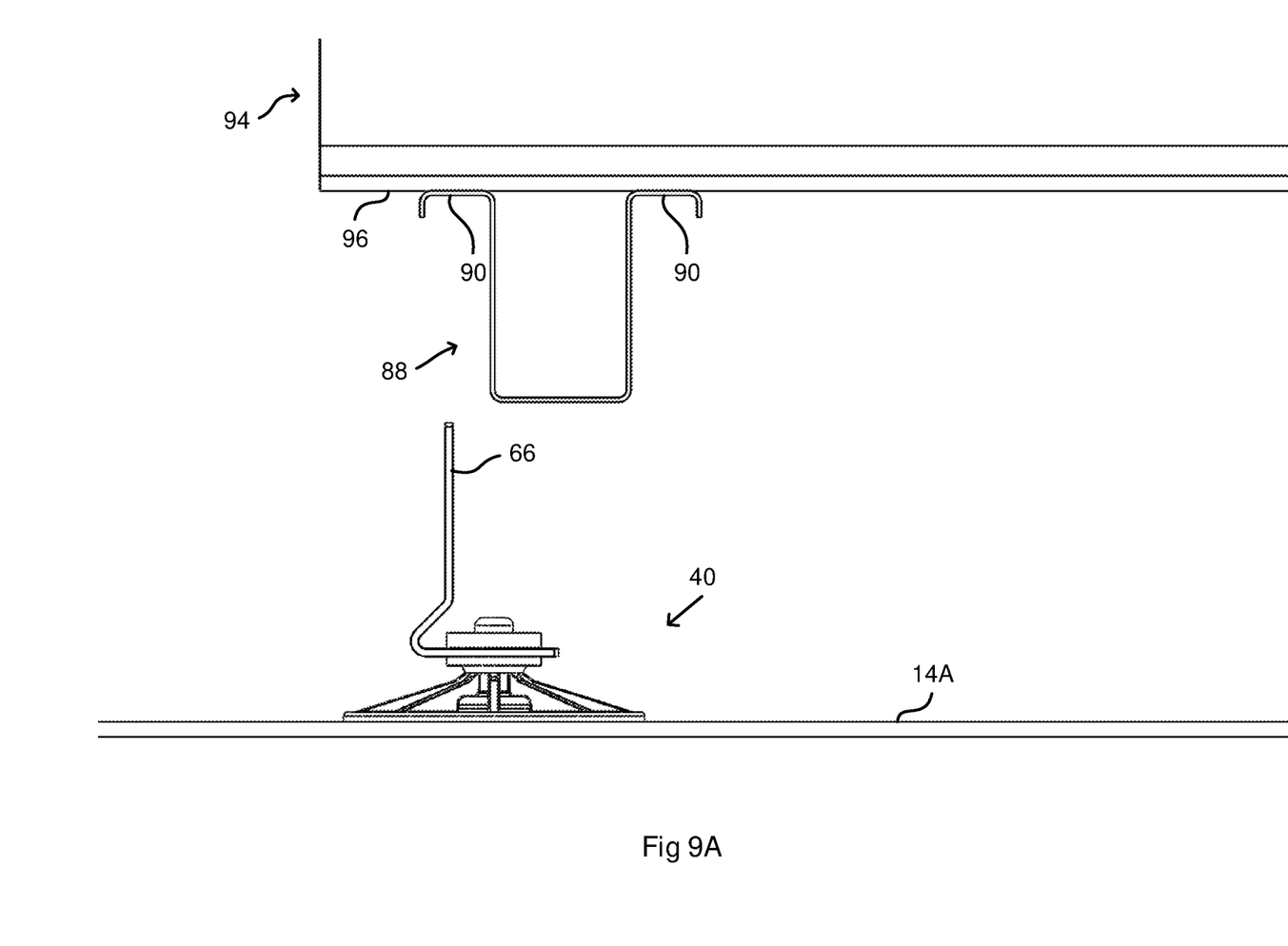
FIG. 9A shows a detailed side view of part of the frame being lowered into position over a riser.

Referring now to FIG. 9, a frame 86 is shown being lowered towards the rear face of the mirror 14A and riser sub-assemblies 40, with the mirror being bent to the desired shape over the forming jig (not shown). The frame 86 includes four equi-spaced purlins or ribs 88 having a U-shaped profile terminating in outwardly flanged ends 90. The purlins 88 are joined to central pair of Z-beams 92 and 94, with the base flanges 96 of the beams 92 and 94 being clinched at 95 to the flanged ends 90 of the purlins 88, as can more clearly be seen in FIGS. 9A and 10A. It will be appreciated that other connection means or forms of bonding may also be used, including riveting, welding and brazing. The beams 92 and 94 are in turn connected together by a central supporting horizontal axle 98 via mounting flanges 100. The heliostat mirror tilts about the axle 98 for elevational or azimuthal adjustment.

Figure 10:
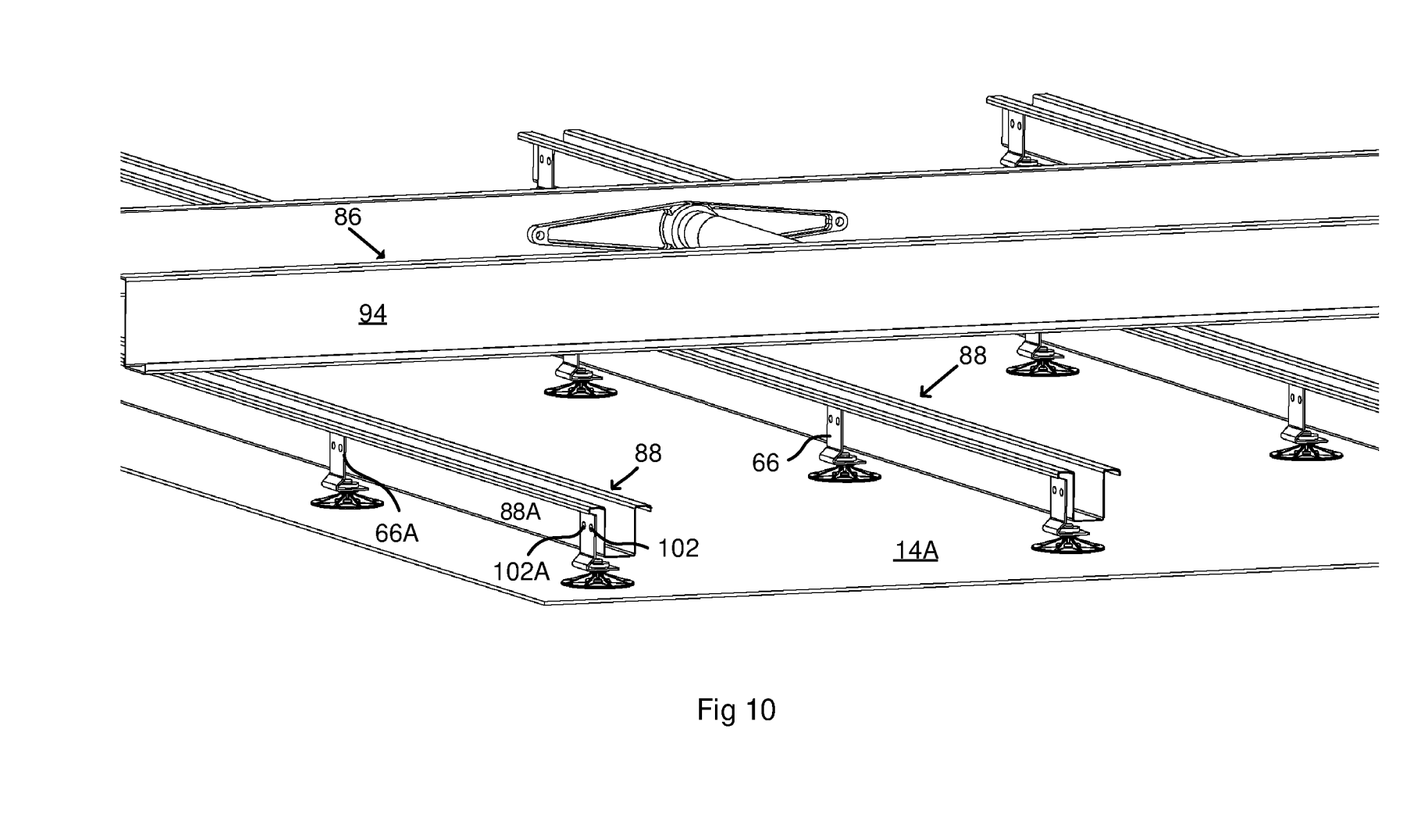
FIG. 10 shows a perspective view of the frame clinched to the risers to form a second embodiment of a heliostat sub-assembly.
Figure 10A:
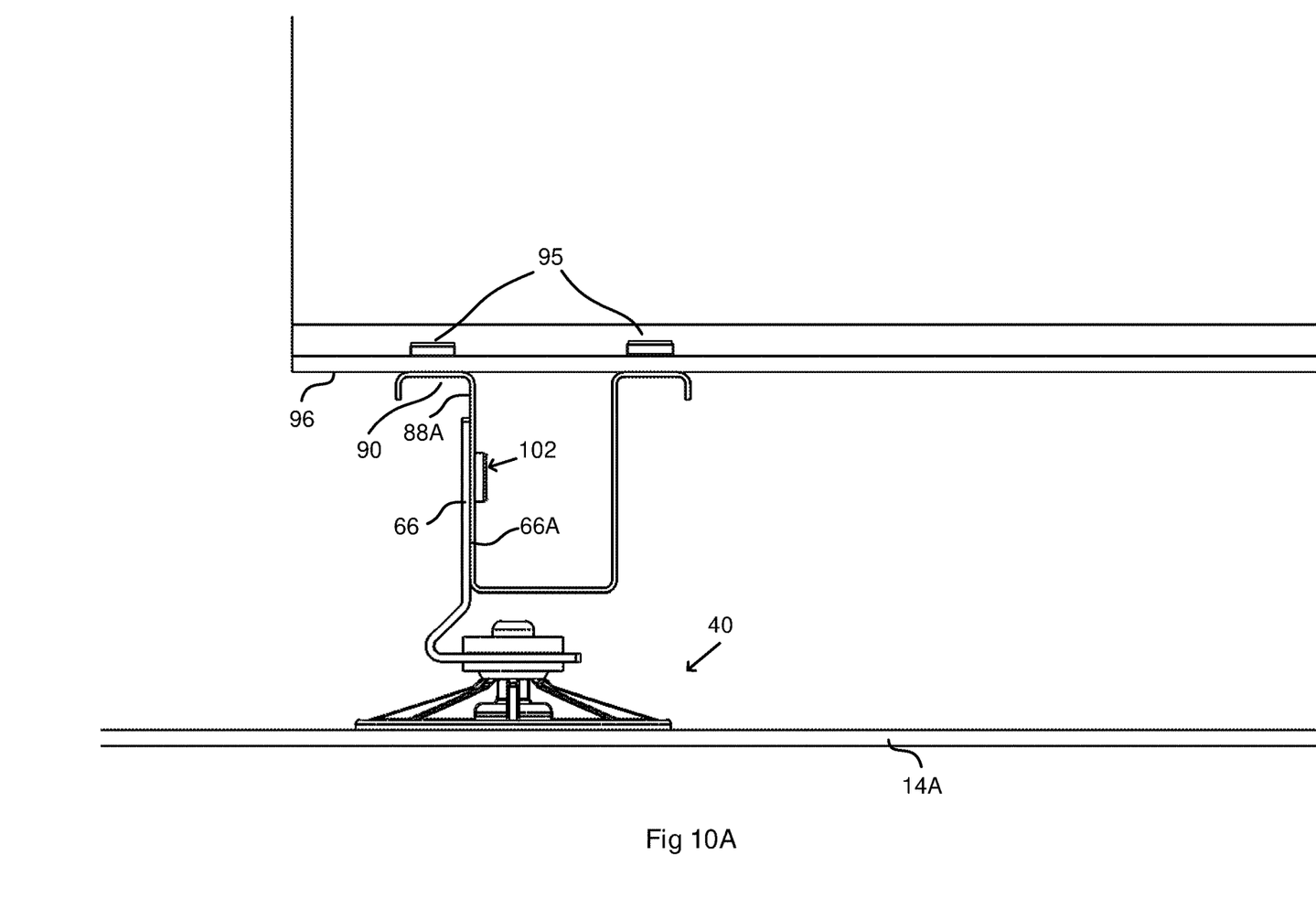
FIG. 10A shows a detailed side view of part of the frame clinched to a riser.

Referring now to FIGS. 10 and 10A, once the frame 86 has been moved to a position in which the side faces 88A of the purlins 88 bear against the corresponding side faces 66A of the tab portions 66 of the riser stems, these are then clinched together as is shown at 102 using an appropriate clinching tool or jig. One or more compression springs (not shown) may be located within the slotted aperture of the foot portion of the riser stem to bias the tab portion 66 against the corresponding side face 88A of the purlin. In FIG. 10, two clinches per tab are shown at 102 and 102A, but it will be appreciated that a single clinch per tab may be suitable, as may more than two clinches depending on the size of the tabs.

An advantage of the second embodiment is that it provides small amounts of play that allow the riser tabs to rotate a little from being perfectly normal to the mirror, and allow the foot portion of the riser tabs to slide a little parallel to the mirror. This allows the risers to be fixed to a frame that has a different coefficient of thermal expansion than the glass. Changes in temperature therefore allow the frame to expand parallel to the glass without building up stresses in the glass, while retaining the frame's ability to provide precise location of the glass in the direction orthogonal to the plane of the glass. Similarly the pin rotation or universal canting ability allows the glass to be slightly curved to generate the focusing shape desirable for the mirror, and allows the small relative rotation of the pin to accommodate this rotation without placing rotational stress on the glued pad.

In some embodiments clinching jigs may also be used to clinch the riser stems to the rib webs to speed up the manufacturing process.

An advantage of the clinching process is that it is a one-step process which requires no drilling or other machining or spot welding operations associated with riveting, bolting or the like. All these operations will tend to compromise the anti-corrosion coating which will necessitate additional post-processing in which anti-corrosion coatings are applied. It further allows for both the risers and the ribs to be pre-galvanised or coated with anti-corrosion paints, with the clinching process not compromising the anti-corrosion coating, or at least limiting compromise.

Once the heliostat sub-assembly has been completed, it can then be fitted with the relevant drive assembly which is coupled to the horizontal support axle 98, and mounted with suitable biaxial articulated movement on an upright post. Alternatively the drive may be fitted to the frame earlier to ensure that there were no deformations of the frame resulting from attaching the drive.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A heliostat sub-assembly, comprising:
   a concave mirror;
   a plurality of risers bonded at predetermined spaced intervals to a rear face of the concave mirror, each riser having a bonding pad and a riser stem extending from the bonding pad; and
   a supporting structure comprising a plurality of spaced ribs interconnected by at least one transverse beam, a spacing between the spaced ribs corresponding to the spaced intervals between the risers, and the spaced ribs being clinched to the riser stems to hold the concave mirror in position;
   wherein each spaced rib of the plurality of spaced ribs has a U-shaped profile terminating in outwardly flanged ends; and
   wherein each riser stem includes a flat tab portion which is clinched to a corresponding spaced rib.

2. The heliostat sub-assembly according to claim 1, wherein the riser stems are coupled to the bonding pads via multi-axial joint assemblies to enable limited multi-pivotal movement of the stems relative to the bonding pads to facilitate alignment of faces of the stems with faces of the spaced ribs defined by webs, and relative expansion and contraction of the concave mirror and supporting structure, an overlap between the riser stems and the webs being sufficient to accommodate clinching with variations in curvature of a glass sheet.

3. The heliostat sub-assembly according to claim 2, wherein each of the riser stems include a foot portion which is slidably connected to a corresponding ball joint-type assembly to enable limited transverse movement of the riser stems relative to the bonding pads to facilitate alignment of faces of the stems with the faces of the spaced ribs defined by webs for subsequent clinching, as well as relative expansion and contraction of the concave mirror and supporting structure once clinched.

4. The heliostat sub-assembly according to claim 2, wherein each of the multi-axial joint assemblies include a pin extending through and held loosely captive within a central aperture passing through the bonding pad and defining a central axis, the pin including an upper portion carrying a bearing component which includes a bearing socket portion which bears slidably against an upper convex portion of the bonding pad.

5. The heliostat sub-assembly according to claim 4, wherein the bearing component is a lower washer, the multi-axial joint assembly further including an upper washer carried on the upper portion of the pin, the upper and lower washers sandwiching a foot portion of the stem therebetween, and being held captive by a retaining formation on the pin.

6. The heliostat sub-assembly according to claim 4, wherein the bonding pad includes a circular or oval base portion, a central turret portion and a plurality of radially extending buttressing flanges extending between the circular or oval base portion and the central turret portion.

7. The heliostat sub-assembly according to claim 4, wherein the pin has an expanded base portion which defines an upper part-spherical or convex surface which bears slidably against a socket portion defined by a central recess within the bonding pad.

8. The heliostat sub-assembly according to claim 4, wherein the multi-axial joint assembly includes play limiting means for limiting multi-axial movement of the riser stems.

9. The heliostat sub-assembly according to claim 8, wherein the play limiting means includes the central aperture being frusto-conical or outwardly tapered relative to the pin extending through the aperture.

10. The heliostat sub-assembly according to claim 9, wherein the play limiting means limits the movement of the riser stem to 4 degrees or less off the central axis of the central aperture.

11. The heliostat sub-assembly according to claim 1, wherein the supporting structure includes a sub-frame of at least a pair of transverse beams joined by at least one cross member and pre-galvanised or treated with an anti-corrosion layer.

12. The heliostat sub-assembly according to claim 1, wherein the spaced ribs are formed from sheet metal.

13. The heliostat sub-assembly according to claim 1, wherein the spaced ribs are formed by being drawn from sheet metal into a desired shape.

14. The heliostat sub-assembly according to claim 13, wherein the spaced ribs are welded, riveted or clinched to the at least one transverse beam at the predetermined spaced intervals.

15. The heliostat sub-assembly according to claim 1, wherein the at least one transverse beam is a Z-beam with base flanges clinched to the outwardly flanged ends of the spaced ribs.

16. A heliostat sub-assembly, comprising:
a concave mirror;
a plurality of risers bonded at predetermined spaced intervals to a rear face of the concave mirror, each riser having a bonding pad and a riser stem extending from the bonding pad; and
a supporting structure comprising a plurality of spaced ribs interconnected by at least one transverse beam, a spacing between the spaced ribs corresponding to the spaced intervals between the risers, and the spaced ribs being clinched to the riser stems to hold the concave mirror in position;
wherein each spaced rib of the plurality of spaced ribs has a U-shaped profile terminating in outwardly flanged ends; and
wherein the riser stems are coupled to the bonding pads via multi-axial joint assemblies to enable limited multi-pivotal movement of the stems relative to the bonding pads to facilitate alignment of faces of the stems with faces of the spaced ribs defined by webs, and relative expansion and contraction of the concave mirror and supporting structure, an overlap between the riser stems and the webs being sufficient to accommodate clinching with variations in curvature of a glass sheet.

17. The heliostat sub-assembly according to claim 16, wherein each of the riser stems include a foot portion which is slidably connected to a corresponding ball joint-type assembly.

18. The heliostat sub-assembly according to claim 16, wherein each of the multi-axial joint assemblies include a pin extending through and held loosely captive within a central aperture passing through the bonding pad and defining a central axis.

19. A heliostat sub-assembly, comprising:
a concave mirror;
a plurality of risers bonded at predetermined spaced intervals to a rear face of the concave mirror, each riser having a bonding pad and a riser stem extending from the bonding pad; and
a supporting structure comprising a plurality of spaced ribs interconnected by at least one transverse beam, a spacing between the spaced ribs corresponding to the spaced intervals between the risers, and the spaced ribs being clinched to the riser stems to hold the concave mirror in position;
wherein each spaced rib of the plurality of spaced ribs has a U-shaped profile terminating in outwardly flanged ends; and
wherein the at least one transverse beam is a Z-beam with base flanges clinched to the outwardly flanged ends of the spaced ribs.

20. The heliostat sub-assembly according to claim 19, wherein the supporting structure includes a sub-frame of at least a pair of transverse beams joined by at least one cross member and pre-galvanised or treated with an anti-corrosion layer.

\* \* \* \* \*